Patented Jan. 7, 1936

2,027,001

UNITED STATES PATENT OFFICE 2,027,001

PRESERVATION OF RUBBER

Winfield Scott, Akron, Ohio, and Horace G. Byers, Washington, D. C., assignors to The Rubber Service Laboratories Co., Akron, Ohio, a corporation of Ohio No Drawing. Original application October 26, 1927, Serial No. 228,969. Divided and this application May 12, 1934, Serial No. 725,406

21 Claims. (Cl. 18—50)

This invention relates to processes for manufacturing vulcanized rubber products and to the products obtained thereby. It is more particularly directed to processes for vulcanizing rubber wherein there is incorporated into a rubber mix of vulcanization characteristics, a compound of the type hereinafter disclosed whereby antioxidant or age resisting properties are developed in the vulcanized rubber product. The invention will be understood from the following description and examples of a preferred mode of operating the process wherein the invention is fully set forth and described.

It is well known to rubber chemists that rubber compounds cured in the presence of vulcanization accelerators such as the aldehyde derivatives of Schiff's bases deteriorate much less rapidly in storage or in service than do similar rubber products cured in the presence of certain other accelerators such, for example, as di-phenyl-guanidine. Other compounds that otherwise would be effective accelerators of the rubber vulcanization process cannot be employed commercially since the presence of such compounds, or of their heat decomposition or sulphur or other reaction products produced in the rubber curing process, apparently cause or aid in causing a relatively rapid deterioration of the vulcanized products. Such rubber products are said to age badly, that is, the rubber becomes hard and loses a large part of its resiliency, while other characteristics such as tensile strength and the like are very detrimentally affected.

The age resisting characteristics of a vulcanized rubber product can be readily ascertained by subjecting samples of the vulcanized product in a bomb to the action of oxygen under pressure and maintained for several hours at an elevated temperature. The treated samples are then examined and tested and the results compared with similar results obtained by testing the unaged vulcanized stock. The deterioration in properties suffered as a result of the oxidation treatment is indicative of the result that would normally be expected from that particular stock during service. Such a test is known as the Bierer-Davis ageing test and produces an effect on a vulcanized rubber stock comparable with that resulting from several years of natural ageing of the rubber.

Certain compounds, for example aniline, the acetaldehyde reaction product of aniline hydrochloride, the aldol reaction product of alpha-naphthylamine and the like have been described previously as suitable materials to be employed in a rubber mix to lessen the tendency of a vulcanized rubber product to deteriorate by oxidation and to increase the effective life of the product. When such compounds have been incorporated into a rubber mix in the proportion of approximately 5% of the weight of the rubber employed, and the rubber stock vulcanized and then artificially aged by heating the stock in a bomb for eighteen hours at 90° C. and under a pressure of 500 pounds of oxygen to the square inch, it has been ascertained that the aged stock would generally retain a tensile strength of approximately one-half that of the unaged stock. On the other hand, a similar stock containing no anti-oxidant, when subjected to the same ageing test was found to have disintegrated to a plastic mass that was incapable of test in the usual manner, when di-phenyl-guanidine and analogous substances were employed as accelerators.

According to the present invention, a new class of anti-oxidants has been found which upon incorporation into a rubber stock, impart such age resisting qualities to the vulcanized stock that samples thereof, when subjected to the artificial ageing tests described, undergo no appreciable loss and in many instances show a substantial increase in tensile strength. The compounds imparting such remarkable anti-oxidant characteristics to vulcanized rubber comprise ammonia derivatives wherein two of the three hydrogens of ammonia have been replaced by aryl or substituted aryl groups, and the reaction products of such derivatives and substituted derivatives.

An example of one mode of operating the invention is illustrated by the following composition wherein diamino-diphenylamine is employed as the anti-oxidant.

A rubber stock was manufactured in the well-known manner comprising

|  | Parts |
|---|---|
| Pale crepe rubber | 80 |
| Zinc oxide | 4 |
| Sulphur | 1.8 |
| Diphenyl-guanidine | 0.8 |
| Diamino-di-phenylamine | 2.4 |

The stock was then vulcanized by heating sheets of the stock in the usual manner for forty minutes and also for one hour in a press maintained at the temperature given by forty pounds of steam pressure to the square inch (that is 287° F.). Portions of the stock cured as set forth were then artificially aged by heating samples of the stock in an oxygen bomb for eighteen hours at a temperature of 90° C. and under a pressure of 500 pounds of oxygen per square inch. After ageing, the stocks still retained the appearance and feel of a vulcanized rubber of high quality. The results obtained upon testing the aged and the unaged stocks are as follows:

Table A

| Time of cure | Hours aged | Modulus of elasticity in lbs./in.² at elongations of— | | | Tensile at break in lbs./in.² | Ultimate elongation |
|---|---|---|---|---|---|---|
| | | 300% | 500% | 700% | | |
| 40 minutes at 287° F | 0 | 196 | 483 | 1,585 | 2,905 | Percent 820 |
| Do | 18 | 320 | 1,030 | 3,185 | 3,185 | 700 |
| 60 minutes at 287° F | 0 | 222 | 522 | 1,805 | 3,350 | 820 |
| Do | 18 | 387 | 1,253 | ------ | 3,285 | 680 |

A rubber stock containing the ingredients specified in the foregoing example with the exception that no anti-oxidant was employed, is known to completely disintegrate when subjected to an artificial ageing test as described. Di-phenyl-guanidine then, when employed as an accelerator, produces a stock that is well known in the rubber trade as a poor ageing compound.

When the aldehyde reaction product of aniline hydrochloride was employed in the above example in the same proportion and in place of the anti-oxidant there set forth, and the vulcanized stock was aged and tested in the manner described in the example, it was found that the tensile strength of the aged stock was approximately one-half that of the unaged product. On the other hand, it is evident from the above results that the use of diamino-diphenylamine, employed in the proportion of approximately 3% of the weight of rubber taken, produces a rubber compound that withstands oxidation particularly well. The stock cured for sixty minutes was deliberately overcured in order to test the anti-oxidant under adverse experimental conditions. Even under such conditions, the stock retained the characteristic properties of vulcanized rubber substantially unimpaired and the loss in tensile strength of the product was practically negligible, being but approximately 2%. This shows that a rubber stock containing the preferred anti-oxidant is substantially unaffected by oxidation changes.

A further example illustrative of the anti-oxidant effect of the preferred type of compounds is the following, wherein there was prepared a mix comprising

| | Parts |
|---|---|
| Pale crepe rubber | 80 |
| Zinc oxide | 4 |
| Sulphur | 1.8 |
| Di-phenyl-guanidine | 0.8 |
| Amino-nitro-diphenylamine | 4 |

The stock was vulcanized in the usual manner by heating in a press maintained under the temperature given by forty pounds steam pressure per square inch (287° F.). Samples of the stock cured for forty and sixty minutes respectively as described were subjected to an artificial ageing test by heating the stocks in an oxygen bomb for eighteen hours at 90° C. and under a pressure of 500 pounds of oxygen per square inch. The results obtained by testing the aged and unaged stocks are as follows:

Table B

| Time of cure | Hours aged | Modulus of elasticity in lbs./in.² at elongations of— | | | Tensile at break in lbs./in.² | Ultimate elongation |
|---|---|---|---|---|---|---|
| | | 300% | 500% | 700% | | |
| 40 minutes at 287° F | 0 | 203 | 494 | 1,570 | 2,590 | Percent 800 |
| Do | 18 | 148 | 372 | 1,080 | 1,503 | 760 |
| 60 minutes at 287° F | 0 | 219 | 513 | 1,810 | 2,920 | 810 |
| Do | 18 | 173 | 429 | 1,375 | 1,495 | 725 |

The above results show that the aged stock suffered a loss of from one-third to about one-half of the original tensile strength. This indicates that although amio-nitro-diphenylamine is not as active an anti-oxidant as is diamino-diphenylamine above described, yet it is more effective for the purpose desired than are the commonly employed anti-oxidants. In all instances the samples that had been subjected to the ageing test retained the characteristic appearance of vulcanized rubber without the development of excessive porosity or blistering.

Derivatives of substituted di-aryl amines have also been found to be active anti-oxidants when employed in a rubber mix. Thus, a rubber stock was prepared by manufacturing a mix comprising

| | Parts |
|---|---|
| Pale crepe rubber | 80 |
| Zinc oxide | 4 |
| Sulphur | 1.8 |
| Di-phenyl-guanidine | 0.8 |
| The acetaldehyde reaction product of 2,4 amino 4' hydroxy-diphenylamine | 2.4 |

The stock was then vulcanized by heating at 287° F. for forty-five minutes in a press and the vulcanized stock was then aged in the manner hereinbefore described and the effect of the ageing process was then determined. The results of the test were as follows:

Table C

| Time of cure | Hours aged | Modulus of elasticity in lbs./in.² at elongations of— | | | Tensile at break in lbs./in.² | Ultimate elongation |
|---|---|---|---|---|---|---|
| | | 300% | 500% | 700% | | |
| 40 minutes at 287° F | 0 | 160 | 343 | 1,108 | 2,270 | Percent 840 |
| Do | 18 | 155 | 384 | 1,105 | 1,258 | 715 |

Even after the severe oxidation treatment to which the stock was subjected, the aged stock appeared to be but slightly affected physically while the stock still retained to a substantial degree the essential characteristics of vulcanized rubber.

Other reaction products and derivatives of the preferred class of anti-oxidents have also been found to be useful in the manufacture of age resisting vulcanized rubber compounds. Thus, as further examples of the scope of the invention, di-nitro-di-phenylamine has been employed as an anti-oxidant. Furthermore, diamino-diphenylamine has been reacted with an excess of an aldehyde, for example acetaldehyde, and the product found to impart age resisting characteristics to rubber compounds. Likewise, diamino-diphenylamine has been reacted with other aldehydes, or aldehyde compounds, such as aldol, and the resulting product digested with an acid such as hydrochloric acid, neutralized and employed as an anti-oxidant. In a similar manner other di-aryl and substituted di-aryl derivatives of ammonia have been successfully employed as anti-oxidants.

The various examples hereinbefore set forth in detail are to be understood as illustrative only and not at all limitative of the scope of the invention. Other compounding ingredients and other proportions of ingredients than those indicated in the various examples may be employed in the manufacture of various types of vulcanized rubber products as is well known to those skilled in the art to which the invention pertains. The invention is to be understood as limited solely by the claims attached hereto as a part of this specification wherein the invention is claimed as broadly as is possible in view of the prior art.

The present application is a division of application Serial No. 228,969 filed by us October 26, 1927.

What is claimed is:

1. The method of preserving rubber which comprises treating rubber with the condensation product of an aliphatic aldehyde with a diarylamine containing two amino groups.

2. The method of preserving rubber which comprises treating rubber with the condensation product of an aliphatic aldehyde with a primary amino substituted diarylamine.

3. A composition comprising rubber and the condensation product of an aliphatic aldehyde with a diarylamine containing two amino groups.

4. A composition comprising rubber and the condensation product of an aliphatic aldehyde with a primary amino substituted diarylamine.

5. A rubber composition which has been vulcanized in the presence of the condensation product of an aliphatic aldehyde with a primary amino substituted diarylamine.

6. The method of preserving rubber which comprises treating rubber with the condensation product of an aliphatic aldehyde containing more than one carbon atom with a diarylamine containing two amino groups.

7. The method of preserving rubber which comprises treating rubber with the condensation product of a straight chain aliphatic aldehyde with a diarylamine containing two amino groups.

8. The method of preserving rubber which comprises treating rubber with the condensation product of an aliphatic aldehyde containing more than one carbon atom with a primary amino substituted diarylamine.

9. A composition comprising rubber and the condensation product of an aliphatic aldehyde containing more than one carbon atom with a diarylamine containing two amino groups.

10. A composition comprising rubber and the condensation product of a straight chain aliphatic aldehyde with a diarylamine containing two amino groups.

11. A composition comprising rubber and the condensation product of an aliphatic aldehyde containing more than one carbon atom with a primary amino substituted diarylamine.

12. The method of preserving rubber which comprises treating rubber with a reaction product of an aliphatic aldehyde and a diamino diphenyl amine.

13. The method of preserving rubber which comprises treating rubber with a reaction product of an aliphatic aldehyde and a 2,4 diamino diphenyl amine.

14. The method of preserving rubber which comprises treating rubber with the reaction product of acetaldehyde and a 2,4 diamino diphenyl amine.

15. The method of preserving rubber which comprises treating rubber with the reaction product of acetaldehyde and 2,4 diamino 4' hydroxy diphenyl amine.

16. The method of preserving rubber which comprises treating rubber with the reaction product of aldol and a diamino diphenyl amine.

17. A vulcanized rubber product possessing age resisting characteristics comprising the vulcanization product of a rubber stock containing prior to the vulcanization of said stock an anti-oxidant comprising a reaction product of an aliphatic aldehyde and a diamino diphenyl amine.

18. A vulcanized rubber product possessing age resisting characteristics comprising the vulcanization product of a rubber stock containing prior to the vulcanization of said stock an anti-oxidant comprising a reaction product of an aliphatic aldehyde and a 2,4 diamino diphenyl amine.

19. A vulcanized rubber product possessing age resisting characteristics comprising the vulcanization product of a rubber stock containing prior to the vulcanization of said stock an anti-oxidant comprising a reaction product of acetaldehyde and a 2,4 diamino diphenyl amine.

20. A vulcanized rubber product possessing age resisting characteristics comprising the vulcanization product of a rubber stock containing prior to the vulcanization of said stock an anti-oxidant comprising a reaction product of acetaldehyde and 2,4 diamino 4' hydroxy diphenyl amine.

21. A vulcanized rubber product possessing age resisting characteristics comprising the vulcanization product of a rubber stock containing prior to the vulcanization of said stock an anti-oxidant comprising a reaction product of aldol and a diamino diphenyl amine.

WINFIELD SCOTT.
HORACE G. BYERS.